United States Patent

Henderson et al.

[11] Patent Number: 5,986,771
[45] Date of Patent: Nov. 16, 1999

[54] METHOD FOR COMPUTING A CONTROL SIGNAL FOR COMBINING DIGITAL IMAGES

[75] Inventors: Todd R. Henderson, Conesus; Kevin E. Spaulding, Spencerport; Douglas W. Couwenhoven, Fairport, all of N.Y.

[73] Assignee: Eastman Kodak Company, Rochester, N.Y.

[21] Appl. No.: 08/934,372

[22] Filed: Sep. 19, 1997

[51] Int. Cl.⁶ ..................................................... H04N 1/40
[52] U.S. Cl. ..................... 358/448; 358/450; 358/540; 348/586
[58] Field of Search .................................... 348/586, 587, 348/592; 358/450, 452, 540, 448, 530

[56] References Cited

U.S. PATENT DOCUMENTS

| | | | |
|---|---|---|---|
| 4,533,937 | 8/1985 | Yamamoto et al. | 348/592 |
| 5,301,016 | 4/1994 | Gehrmann | 348/586 |
| 5,436,671 | 7/1995 | Gehrmann | 348/587 |
| 5,444,496 | 8/1995 | Gehrmann | 348/587 |
| 5,455,633 | 10/1995 | Gehrmann | 348/587 |
| 5,812,214 | 9/1998 | Miller | 348/587 |

*Primary Examiner*—Thomas D. Lee
*Attorney, Agent, or Firm*—Raymond L. Owens

[57] ABSTRACT

A method for determining a control signal for use in combining a first digital image that includes both a foreground region and a key color region having an associated key color with a second background digital image, both images including pixels having color values is disclosed. The method includes segmenting the first digital image into a foreground region and a key color region; and identifying transition region pixels in the first digital image that are in the vicinity of a boundary between the segmented foreground region and the segmented key color region. The method further includes computing a color difference signal between the color values of the first digital image and the key color for at least some pixels in the transition region; and computing a control signal for transition region pixels as a function of the color difference signal, where the control signal is to be used to combine the foreground region of the first digital image with the second background digital image.

19 Claims, 6 Drawing Sheets

METHOD FOR COMPUTING A CONTROL SIGNAL FOR COMBINING DIGITAL IMAGES

CROSS REFERENCE TO RELATED APPLICATIONS

The present invention is related to commonly assigned U.S. patent application Ser. No. 08/934,373 filed Sep. 19, 1997, entitled "Method For Segmenting A Digital Image Into a Foreground Region and a Key Color Region" to Todd R. Henderson et al., and commonly assigned U.S. patent application Ser. No. 08/934,178 filed Sep. 19, 1997, entitled "Method For Combining a First Digital Image and a Second Background Digital Image" to Todd R. Henderson et al., assigned to the assignee of the present invention. The disclosure of these related applications is incorporated herein by reference.

FIELD OF THE INVENTION

This invention pertains to the field of digital imaging, and more particularly to producing control signals useable during the process of combining a first digital image and a second background digital image.

BACKGROUND OF THE INVENTION

Many different types of so-called "special-effects" can be created using digital imaging techniques. One such class of special-effects techniques involves inserting the foreground of one image into a different background image. This makes it possible for a person or object to appear to be in a different setting than they really are. For example, the weatherman can appear to be standing in front of a weather map, when in reality he is standing in front of a blue wall, or an actor can appear to be standing on the edge of a cliff, when in reality he is actually performing in the safety of a studio. Typically, these methods rely on having the foreground object photographed in front of a brightly colored backdrop of a known color. A common backdrop color is blue, which is why this technique is often referred to as "blue-screening."

Figure 1:
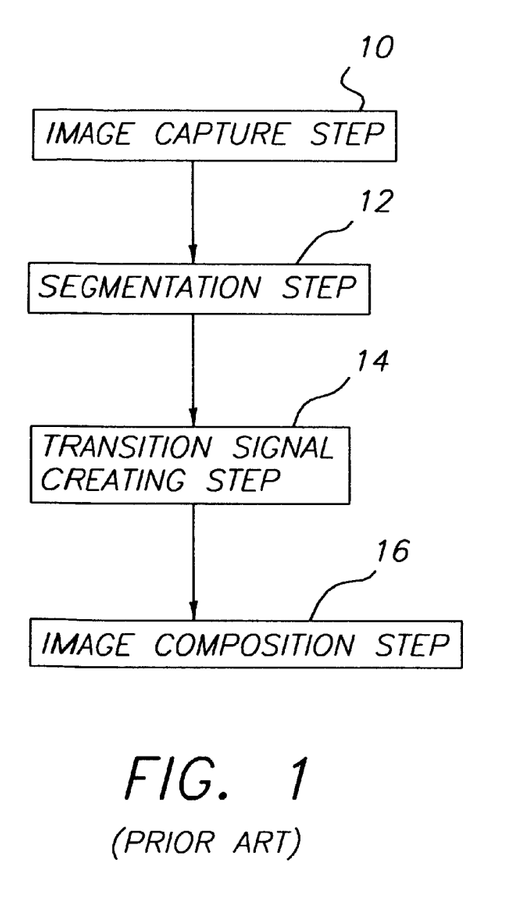
FIG. 1 is a flow diagram illustrating a prior art method for compositing two images.

The basic steps involved with implementing a typical blue-screening algorithm are illustrated in FIG. 1. First, an object is photographed in front of a brightly colored backdrop of a known color which is shown as an image capture step 10. The captured image will contain a foreground region corresponding to the object being photographed, and a key color region, corresponding to the brightly colored backdrop. The key color region has a key color such as bright green or bright blue.

A segmentation step 12 is next used to segment the captured image into the foreground region and the key color region by detecting portions of the image that have the key color. Since the color of the backdrop will not be perfectly constant, the key color will typically be characterized by a range of color values surrounding some nominal color value, rather than a single point in color space.

Many blue-screening algorithms also include a transition signal creation step 14. This is useful because the image will typically contain some foreground pixels that have been contaminated by the key color. For example, the pixels that occur along the boundary between the foreground region and the key color region usually contain a mixture of foreground color and key color. The transition signal is determined to indicate the relative amount of foreground color and key color contained in each contaminated pixel.

Finally, an image composition step 16 is used to combine the foreground region of the captured image with a second background image. During this step, the foreground region of the captured image is inserted into the background image. For the foreground pixels that were determined to be contaminated with the key color, the transition signal can be used to remove the appropriate amount to key color and replace it with the corresponding background image.

Figure 2A:
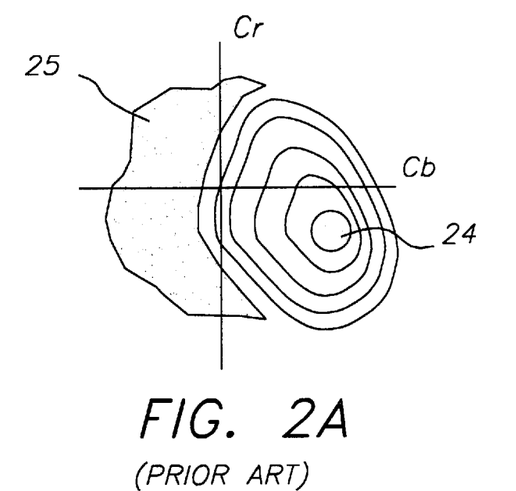
FIGS. 2(a) through (c) illustrate a number of prior art methods used for the computation of the control signal.

Several methods have been disclosed in the prior art for the transition control signal generation step 14 shown in FIG. 1. These methods generally involve converting the image data into a luminance-chrominance color space representation, such as the well-known YCrCb or CIELAB color spaces. Examples of different control signal generation approaches that can be found in prior art are shown in FIG. 2. See U.S. Pat. Nos. 4,533,937, 5,301,016, 5,444,496, and 5,455,633. In each of these examples a key color region is shown. FIG. 2(a) shows a first vector 20 extending from the origin of the Cr-Cb chrominance plane to the key color location 21, and a second vector 22 that extends from a pixel color value 23 to the nearest transition boundary in the same vectorial direction as the first vector 20. The length of the first vector 20 will be referred to as $D_{kc}$, and the length of the second vector 22 will be referred to as D. The corresponding control signal is calculated by $k=D/D_{kc}$.

Figure 2B:
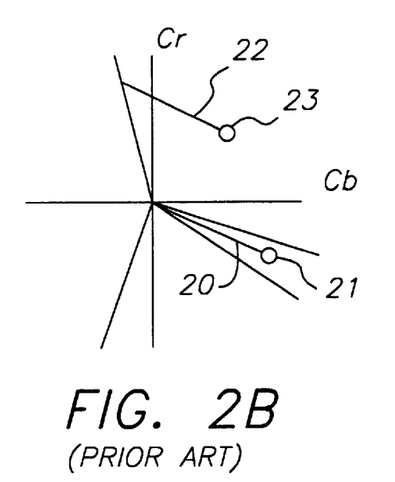

FIG. 2(b) shows a key color region 24 where k=1 and a foreground region 25 where k=0. Values of k that fall in between 0 and 1 are computed via radial interpolation with respect to the center of the key color region 24.

Figure 2C:
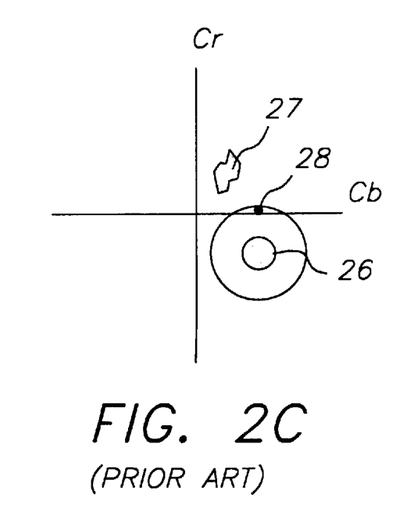

FIG. 2(c) shows another method for computing a control signal for transition pixels in an image. A color location of a key color region 26 is defined, as well as a color location of a foreground picture signal region 27 corresponding to a foreground portion of the image. For a transition pixel with a color location 28, a control signal k is computed by the equation k=(Lx−L)/Lx, where Lx is the distance between the color location of the foreground picture signal region and the color location of the key color, and L is the distance between the color location of a transition pixel and the color location of the key color.

All of the previous prior art methods use different ways to determine what is a transition region pixel. However, they all have the disadvantage that colors in the digital image that are within the part of color space identified as transition will be categorized as part of the transition region. For example, if a subject was wearing a shirt similar in color and lightness to the key color, all of these methods would incorrectly identify the pixels of the subjects shirt as either part of the key color region, or if the shirt was slightly different the pixels would be categorized as part of the transition region. The pixels making up the subject's shirt, however, should be classified as part of the foreground region. The methods previously described would compute a control signal that was inaccurate due to the incorrect identification of the pixels of the subject's shirt.

SUMMARY OF THE INVENTION

It is an object of the present invention to provide a method for overcoming the above deficiencies, and which minimizes inaccurate control signal values.

It is another object of the present invention to provide an improved method for identifying transition region pixels so that the computation of the control signal will result in higher accuracy so that pixels belonging to the foreground region are not misclassified as transition region pixels.

These objects are achieved by a method for determining a control signal for use in combining a first digital image that includes both a foreground region and a key color region having an associated key color with a second background digital image, both images including pixels having color values, comprising the steps of:

a) segmenting the first digital image into a foreground region and a key color region;

b) identifying transition region pixels in the first digital image that are in the vicinity of a boundary between the segmented foreground region and the segmented key color region;

c) computing a color difference signal between the color values of the first digital image and the key color for at least some pixels in the transition region; and d) computing a control signal for transition region pixels as a function of the color difference signal, where the control signal is to be used to combine the foreground region of the first digital image with the second background digital image.

ADVANTAGES

The present invention has an advantage over the prior art in that it provides a more accurate control signal for the use of combining the foreground region of the first digital image with the second background digital image. The combination of both spatial and spectral techniques and the methods in which these techniques are implemented enables the present invention to have fewer control signal value inaccuracies in comparison to the methods described in the prior art.

DETAILED DESCRIPTION OF THE INVENTION

This invention can be applied to digital images captured by a digital still camera, a video camera, or other sources of digital images such as scanned photographs or scanned photographic negatives. The desired improvement is accomplished by defining a spatial transition region in the vicinity of the boundary between a foreground region and a key color region of a digital image, and computing a control signal for at least some pixels in the transition region based on a color difference between the color values of the transition region pixels and the key color.

Figure 3:
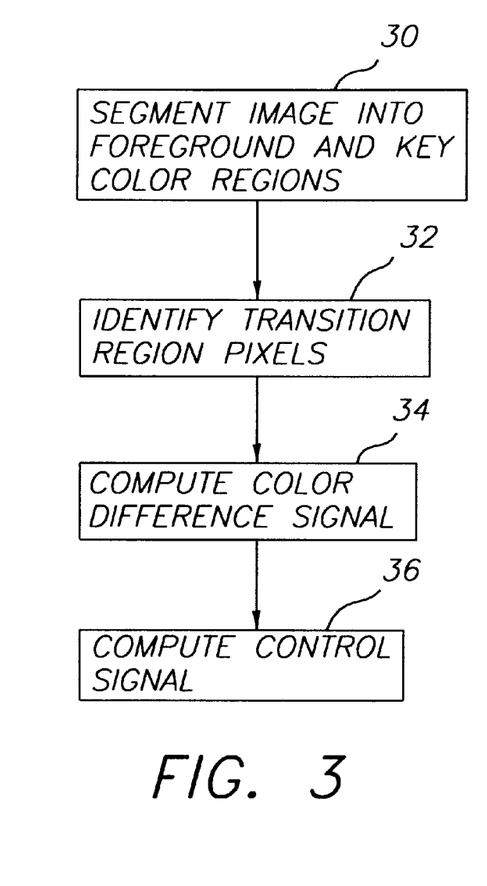
FIG. 3 is a flow diagram illustrating one preferred embodiment of the present invention.

A series of steps associated with one preferred embodiment of the present invention is shown in FIG. 3. First, a segmentation step 30 is performed to separate an image into a foreground region and a key color region. The resultant boundary between the foreground region and the key color region is used in an transition region pixel identification step 32. Color values of the identified transition pixels from step 32 are used in a color difference signal computation step 34. The purpose of this step is to determine how much each identified transition pixel has been contaminated by the key color. The color difference signal is then utilized in a control signal computation step 36.

Figure 4A:
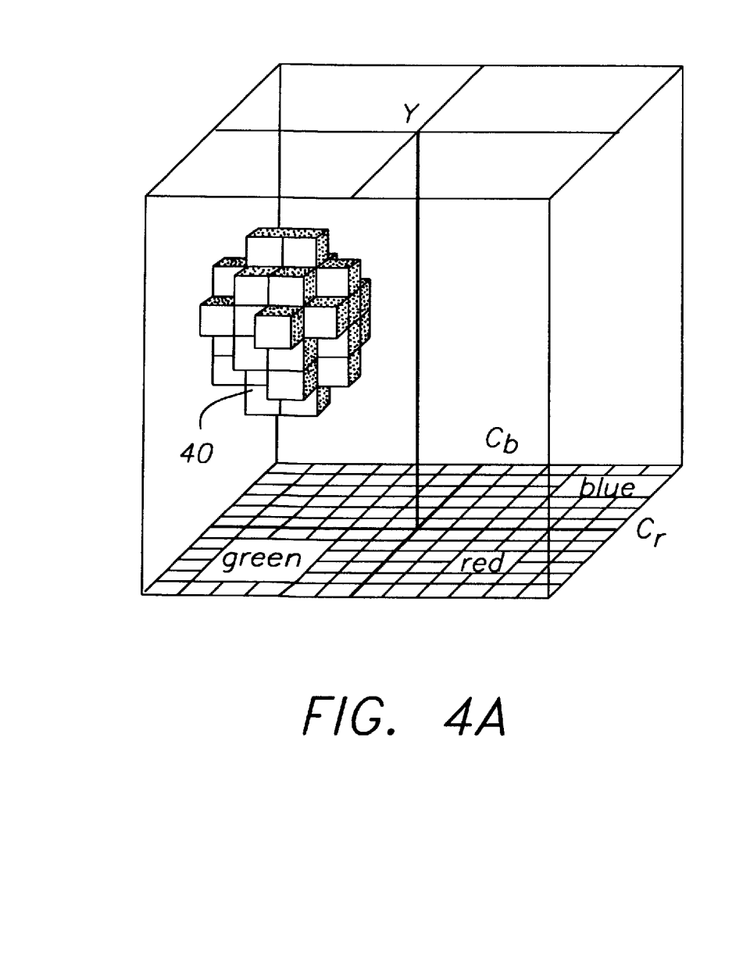
FIG. 4(a) illustrates the use of a multi-dimensional look-up table to describe the key color volume for segmentation purposes and 4(b) illustrates a key color volume defined by ranges of hue angles and chroma values as a function of a luminance signal.
Figure 4B:
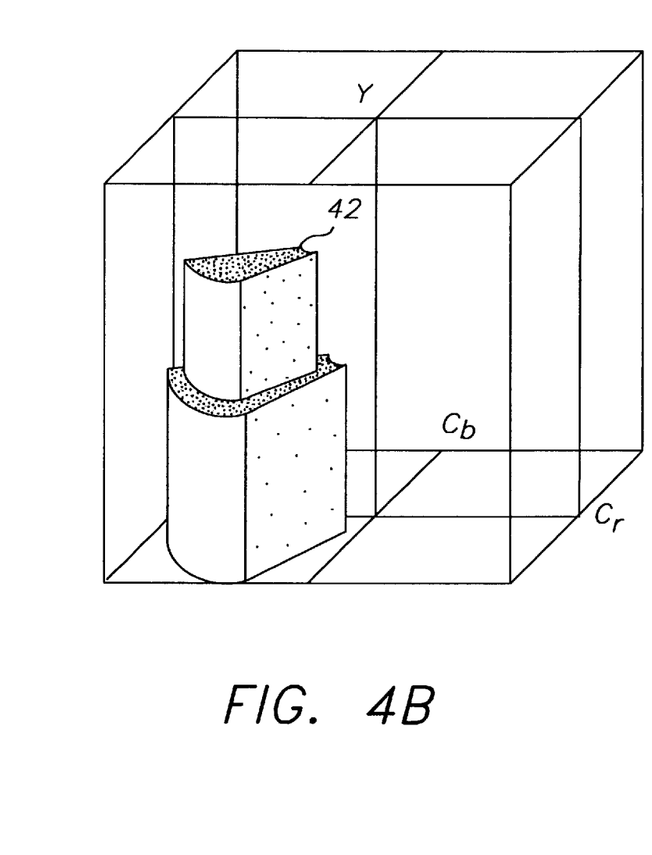

Considering each of these steps in more detail, in accordance with the present invention, the segmentation step 30 can be performed several ways. Preferably, the first digital image is segmented by comparing the color values of pixels in the first digital image with the key color. In particular, the key color is represented by a key color volume in a color space. The pixels of the first digital image having color values that fall within the key color volume are identified as belonging to the key color region. Two examples of a key color volume, as described in the above referenced U.S. patent application Ser. No. 08/934,373 filed concurrently herewith are shown in FIG. 4(a) and FIG. 4(b), respectively. FIG. 4(a) illustrates using a multi-dimensional look-up table for describing the key color volume 40, and FIG. 4(b) illustrates a key color volume 42 defined by using ranges of hue angles and chroma values. The hue angle and chroma value ranges may vary as a function of a luminance signal.

Another segmentation method in accordance with the present invention involves computing a difference signal between the first digital image and a reference digital image. In this case, the reference digital image is an image where the subject of interest was not included. Pixels in the first digital image having a large difference signal are classified as foreground pixels, and pixels having a small difference signal are classified as key color pixels.

Next, the identify transition region pixels step 32 will be described in more detail. This step involves the creation of the transition region by identifying pixels in the first digital image that are in the vicinity of the boundary between the segmented foreground and key color regions. Typically, the transition region will only include pixels in the foreground region since pixels that were identified as belonging to the key color region will not usually be contaminated. Although there are a number of ways to create a spatial transition region, a preferred embodiment of this invention involves the use of a convolution filter.

Figure 5A:
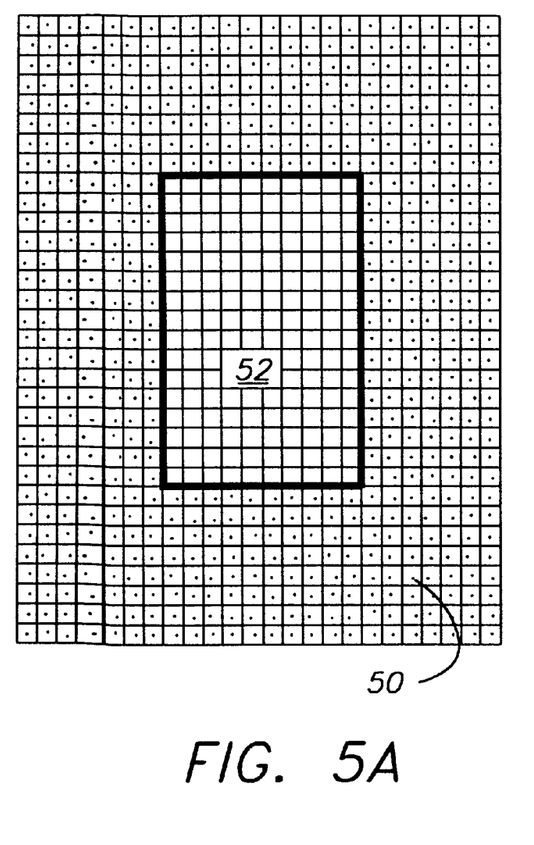
FIGS. 5(a) and (b) illustrate the spatial creation of the transition region.
Figure 5B:
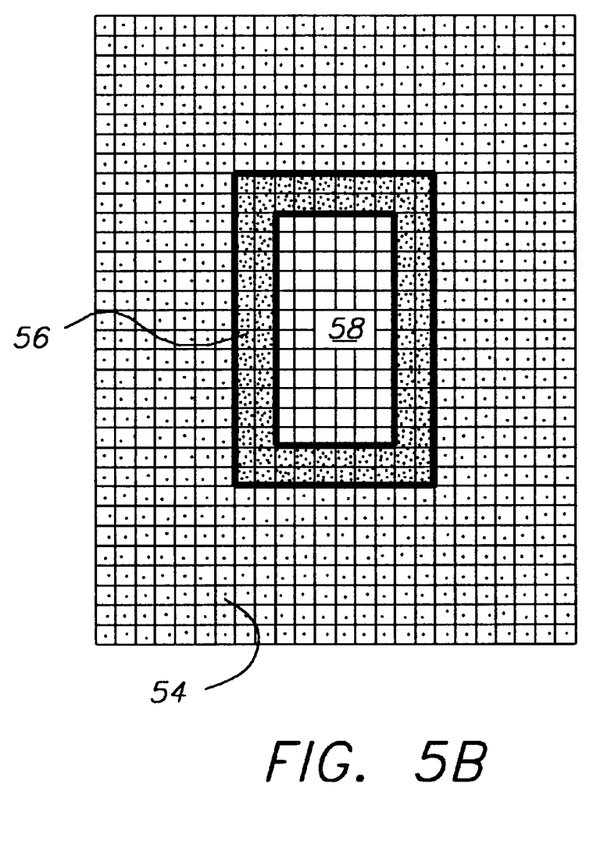

Consider an example mask image shown in FIG. 5(a) generated by the segmentation step 30. The shaded area represents the pixels identified as being in the key color region 50, and the unshaded area represents the foreground region 52. Generally, the segmentation mask will have a first value (e.g., "0") for the foreground region, and a second value (e.g., "1") for the key color region. This mask image is convolved with a convolution filter to determine a convolved mask image. Preferably a low pass filter is used for the convolution filter, where the radius of the convolution filter corresponds to the desired width of the transition region. Pixels in the convolved mask image having values in a specified range (e.g., between 0.0 and 0.5) are identified as belonging to the transition region. For computational efficiency, the convolved mask image only needs to be calculated for pixels in the mask image that were classified as foreground pixels. FIG. 5(b) illustrates the convolved mask image. The lightly shaded area represents the key color region 54, the dark shaded area represents the transition region 56, and the unshaded area represents the resulting foreground region 58.

Once the transition region has been identified, the next step involves the generation of a color difference signal. In a preferred embodiment of this invention, the color difference signal represents the color difference between the key color and the color values of the foreground pixels in the first digital image. For computational efficiency, it is only necessary to compute the color difference signal for those foreground pixels that have been identified as belonging to the transition region, since these are the only pixels for which the control signal will depend on the color difference signal. Therefore, in the following discussion the computation of the color difference signal will only be described relative to the pixels in the transition region.

In a preferred embodiment of this invention, the color difference signal is made up of two components. The first component is a chroma difference signal, and the second component is a hue difference signal. In general, both of the color difference components may be computed as a function of a luminance signal.

Figure 6:
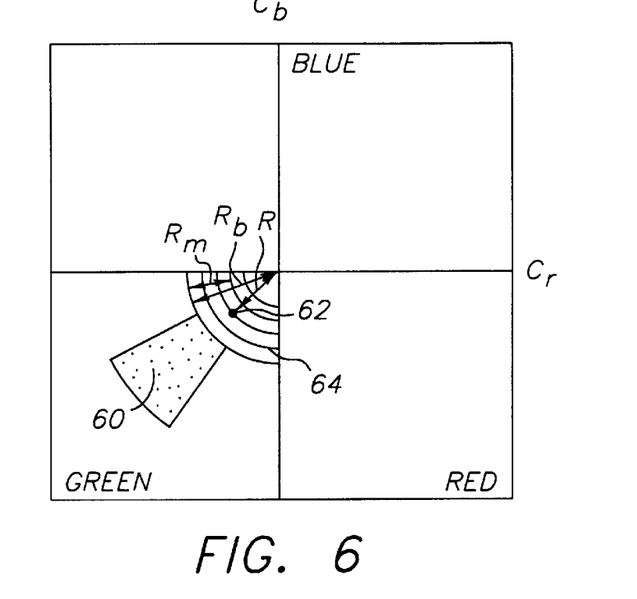
FIG. 6 is a diagram illustrating constant values for the chroma difference signal in relation to a key color volume projected into a chrominance plane.

The chroma difference signal can be defined as the difference between a chroma value for a pixel in the transition region and a chroma value of the key color. More specifically, if the key color is represented by a key color volume in a color space then one convenient form of the chroma difference signal is given by the difference between a chroma value for a pixel in the transition region and a chroma boundary for the key color volume. For purposes of illustration, consider a key color volume defined by using ranges of hue angles and chroma values as shown in FIG. 4(*b*). FIG. 6 illustrates a cross-section of the key color volume 60 at some luminance level. The chroma boundary of the key color volume in this case is shown as $R_b$. The color value 62 for some pixel in the transition region has a corresponding chroma value given by R. A chroma difference signal can be calculated by computing the difference between the two chroma values:

$$\Delta R = R_b - R \qquad (1)$$

In some cases it may be desirable to compute a fractional chroma difference signal such as $$k_r = \Delta R / R_m \qquad (2)$$

where $R_m$ is a maximum chroma difference signal, beyond which the color value is assumed to be uncontaminated. Also shown on this figure are a set of constant chroma difference curves 64. The value of the chroma difference signal will be constant everywhere along one of these curves. In a preferred embodiment of this invention, the range of $k_r$ is limited to be between 0.0 and 1.0. Values outside of this range are clipped accordingly.

Similarly, the hue difference signal can be defined as the difference between a hue value for a pixel in the transition region and a hue value of the key color. More specifically, if the key color is represented by a key color volume in a color space, then one convenient form of the hue difference signal is to compute the difference between a hue value for a pixel in the transition region and a hue boundary for the key color volume.

Figure 7:
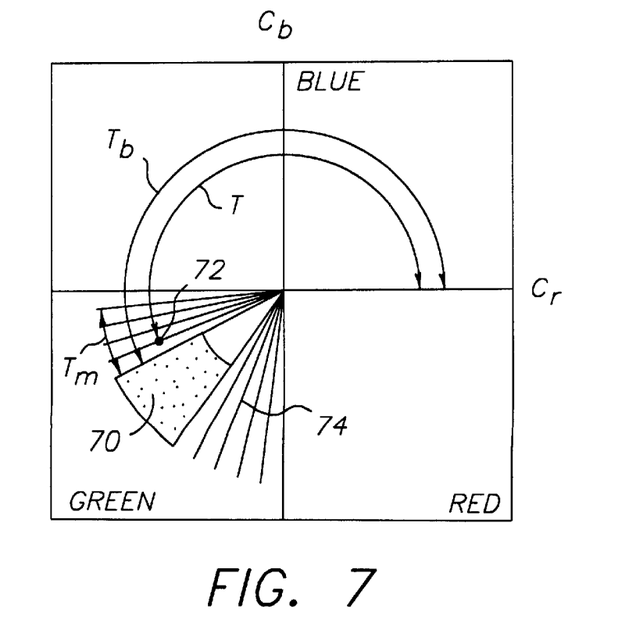
FIG. 7 is a diagram illustrating constant values for the hue difference signal in relation to a key color volume projected into a chrominance plane.

FIG. 7 illustrates a cross-section of the key color volume 70 at some luminance level. The hue boundary of the key color volume in this case is shown as $T_b$. The color value 72 for some pixel in the transition region having a hue value is given by T. A hue difference signal can be calculated by computing the absolute difference between the two hue values:

$$\Delta T = |T_b - T| \qquad (3)$$

Again, in some cases it may be desirable to compute a fractional hue difference signal such as:

$$k_t = \Delta T / T_m \qquad (4)$$

where $T_m$ is a maximum hue difference signal, beyond which the color value is assumed to be uncontaminated. Also shown on FIG. 7 are a set of constant hue difference lines 74. The value of the hue difference signal will be constant everywhere along one of these lines. In a preferred embodiment of this invention, the range of $k_t$ is limited to be between 0.0 and 1.0. Values outside of this range are clipped accordingly.

As illustrated in FIG. 4(*b*), it should be noted that the hue and chroma boundaries of the key color value may vary with luminance level. In this case, the color difference signals can be calculated according to the corresponding key color values at each luminance level. Additionally, the key color volume can be represented by some arbitrary shape as illustrated in FIG. 4(*a*). In this case, the color difference signal could be computed in many different ways. For example, the distance between the color value of the transition pixel and the closest point on the key color volume could be computed.

Once the color difference signal has been calculated, the next step is the control signal generation step 36. The basic concept involved in this step is that pixels having a small color difference relative to the key color are likely to be highly contaminated by the key color. Conversely, pixels having a large color difference relative to the key color should not be contaminated significantly. The control signal, which is intended to be a measure of the amount of contamination for each pixel, is therefore tightly coupled to the color difference signal.

Figure 8:
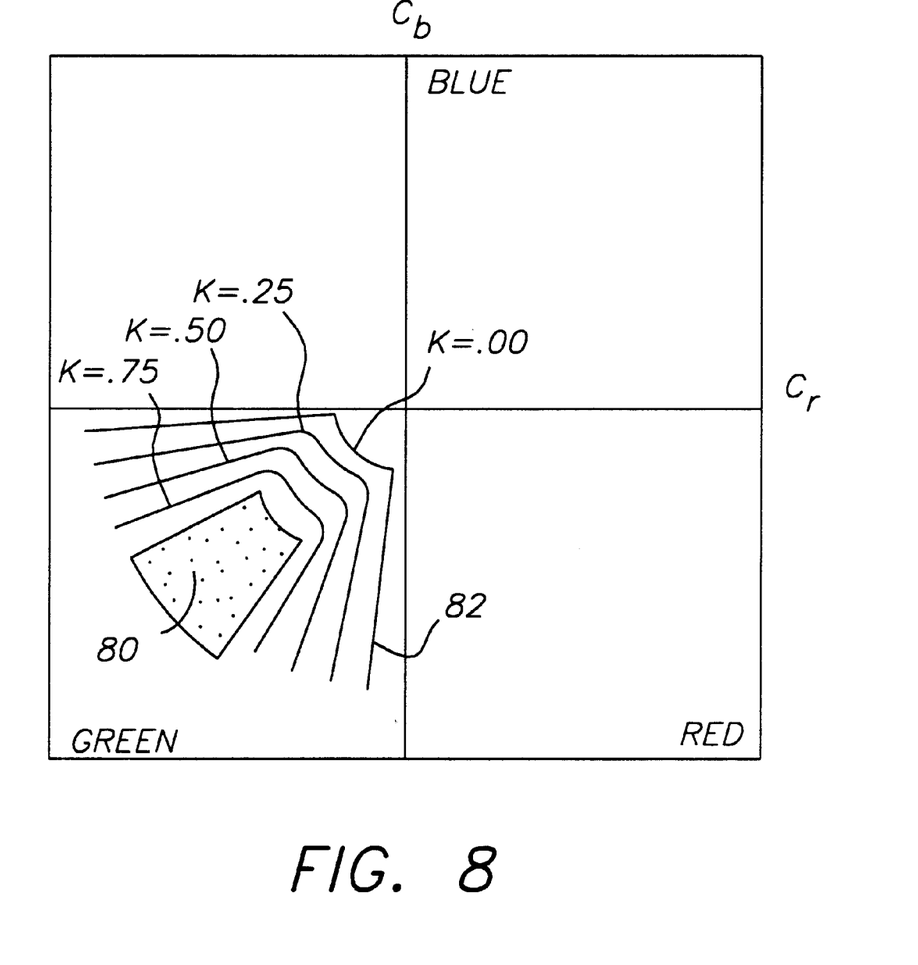
FIG. 8 is a diagram illustrating constant values for the control signal in relation to a key color volume projected into a chrominance plane.

For the example described above where a hue difference signal and a chroma difference signal were determined, an equation that can be used to compute the control signal k is given by:

$$k = 1 - [1 - (1 - k_t)^{\alpha_t}(1 - k_r)^{\alpha_r}]^{\alpha_o} \qquad (5)$$

where $k_t$ is the relative hue difference signal, $k_r$ is relative chroma difference signal, and $\alpha_t$, $\alpha_r$, and $\alpha_o$ are constants and are typically in the range of 0.01 to 100.0. The constants $\alpha_t$ and $\alpha_r$ are used to adjust the relative contributions of the hue difference signal and the chroma difference signal to the control signal. The constant $\alpha_o$ is used to adjust how quickly the control signal changes as a function of the color difference signals. It can be seen that if both the relative hue difference signal and the relative chroma difference signal are small, that the resulting control signal will be close to 1.0. Conversely, if either the relative hue difference signal or the relative chroma difference signal are large (near 1.0), then the resulting control signal will be close to 0.0. FIG. 8 illustrates a cross-section of the key color volume 80 at some luminance level, together with a set of curves of constant control signal 82. Each of the curves of constant control signal is labeled with its corresponding k value. Again, it should be noted that the shape of the key color volume may be a function of luminance, and therefore the curves of constant control signal may also be a function of luminance.

It will be obvious to one skilled in the art that the above equation for determining the control signal k is simply a representative example, and that many different equations could be used to compute the control signal from the color difference signal. The equation could be easily modified to adjust the range and/or polarity of the control signals that are produced, or to use a totally different functional form. The particular relationship that is optimal for a given application will be dependent on factors such as the shape of the key color volume, and the form of the image composition algorithm that is used.

Typically the equation that is used to compute the control signal from the color difference signal will have some limiting color difference beyond which the control signal will be at its minimum (or maximum) value. In the above example, this corresponds to the curve of constant control signal in FIG. 8 where the k=0.0. In this case, the maximum hue difference signal $T_m$ and the maximum chroma difference signal $R_m$ will define the limiting color difference. For computational efficiency, it is unnecessary to compute the control signal for color values which fall outside of this limit. For this purpose, it may be useful to define an enlarged key color volume which represents the boundary beyond which the control signal doesn't change. If a color value is tested and found to be outside this enlarged key color volume, then it is unnecessary to perform any additional calculations to determine the control signal. One way to implement this is to exclude such pixels from the set of transition region pixels.

The resulting control signal is used in the image composition step 16 where the foreground region of the first digital image is combined with the second background digital image. There are several methods that can be used to accomplish this image composition step. One such method is to combine the first and second digital images by performing a weighted average of the color values of the first digital image and the color values of the second digital image, where the weighting values are determined from the control signal. In the simplest case, the weighting value for the first digital image is simply given by 1-k, and the weighting value for the second digital image is given by k. Other, more complex relationships between the control signal and the weighing values could also be used.

Another method is to combine the first digital and second digital image by performing a weighted average of the color values of the first digital image, the color values of the second digital image, and the key color, where the weighting values are determined from the control signal. For example, the first and second digital images can be combined using the equation:

$$R=F+kS-kC \qquad (6)$$

where k is the control signal, F is the color value of a pixel in the first digital image, S is the color value for a corresponding pixel in the background digital image, C is the key color, and R is the resulting color value of the combined image.

A computer program product having a computer program stored therein can be used for determining a control signal for use in combining a first digital image that includes both a foreground region and a key color region having an associated key color with a second background digital image, both images being comprised of pixels having color values. The computer program product may comprise, for example, magnetic storage media such as a magnetic disk (floppy disk) or magnetic tape; optical storage media such as optical disks, optical tape and solid state storage devices such as random access memory (RAM); read only memory (ROM); or any other physical device or medium employed to store a computer program.

The invention has been described in detail with particular reference to certain preferred embodiments thereof, but it will be understood that variations and modifications can be effected within the spirit and scope of the invention. For example, the order of the particular steps in the process can be modified in a number of different ways without changing the final results that are produced.

PARTS LIST

| | |
|---|---|
| 10 | image capture step |
| 12 | segmentation step |
| 14 | transition signal creation step |
| 16 | image composition step |
| 20 | first vector |
| 21 | key color location |
| 22 | second vector |
| 23 | pixel color value |
| 24 | key color region |
| 25 | foreground region |
| 26 | key color region |
| 27 | foreground picture signal region |
| 28 | color location |
| 30 | segmentation step |
| 32 | transition region pixel identification step |
| 34 | color difference signal computation step |
| 36 | control signal computation step |
| 40 | key color volume |
| 42 | key color volume |
| 50 | key color region |
| 52 | foreground region |
| 54 | key color region |
| 56 | transition region |
| 58 | foreground region |
| 60 | key color volume |
| 62 | color value |
| 64 | constant chroma difference curves |
| 70 | key color volume |
| 72 | color value |
| 74 | constant hue difference lines |
| 80 | key color volume |
| 82 | curves of constant control signal |

What is claimed is:

1. A method for determining a control signal for use in combining a first digital image that includes both a foreground region and a key color region having an associated key color with a second background digital image, both images including pixels having color values, comprising the steps of:

a) segmenting the first digital image into a foreground region and a key color region;

b) identifying transition region pixels in the first digital image that are in the vicinity of a spatial boundary between the segmented foreground region and the segmented key color region;

c) computing a color difference signal between the color values of the first digital image and the key color for at least some pixels in the transition region; and d) computing a control signal for transition region pixels as a function of the color difference signal, where the control signal is to be used to combine the foreground region of the first digital image with the second background digital image.

2. The method of claim 1 wherein the first digital image is segmented by comparing the color values of pixels in the first digital image with the key color.

3. The method of claim 2 wherein the key color is represented by a key color volume in a color space.

4. The method of claim 3 wherein the first digital image is segmented by identifying pixels having color values that fall within the key color volume.

5. The method of claim 3 wherein pixels having color values outside an enlarged key color volume are excluded from the transition region pixels.

6. The method of claim 1 wherein the first digital image is segmented by computing a difference between the first digital image and a reference digital image.

7. The method of claim 1 wherein step b) further includes:
   i) creating a mask image where the foreground region has a first value, and the key color region has a second value;
   ii) convolving the mask image with a convolution filter to determine a convolved mask image; and
   iii) identifying pixels having a convolved mask image value in a certain range as transition region pixels.

8. The method of claim 1 wherein the color difference signal includes a hue difference signal and a chroma difference signal.

9. The method of claim 8 wherein the hue difference signal is the difference between a hue value for a pixel in the transition region and a hue value for the key color.

10. The method of claim 9 wherein the key color is represented by a key color volume in a color space and the hue difference signal is the difference between a hue value for a pixel in the transition region and a hue boundary for the key color volume.

11. The method of claim 8 wherein the chroma difference signal is the difference between a chroma value for a pixel in the transition region and a chroma value of the key color.

12. The method of claim 11 wherein the key color is represented by a key color volume in a color space and the chroma difference signal is the difference between a chroma value for a pixel in the transition region and a chroma boundary for the key color volume.

13. The method of claim 8 wherein the control signal is given by $$k=1-[1-(1-k_t)^{\alpha_t}(1-k_r)^{\alpha_r}]^{\alpha_o}$$

where $k_t$ is the hue difference signal, $k_r$ is the chroma difference signal, and $\alpha_t$, $\alpha_r$, and $\alpha_o$ are constants.

14. A method for determining a control signal for use in combining a first digital image that includes both a foreground region and a key color region having an associated key color with a second background digital image, both images being comprised of pixels having color values, comprising the steps of:
   a) segmenting the first digital image into a foreground region and a key color region;
   b) identifying transition region pixels in the first digital image that are in the vicinity of a spatial boundary between the segmented foreground region and the segmented key color region;
   c) computing a color difference signal between the color values of the first digital image and the key color for at least some pixels in the transition region;
   d) computing a control signal for the transition region pixels as a function of the color difference signal, where the control signal is to be used to combine the foreground region of the first digital image with the second background digital image; and
   e) combining the first digital image with a second background digital image to produce the composite image.

15. The method of claim 14 wherein step e) includes performing a weighted average of the color values of the first digital image, and the color values of the second digital image, where the weighting values are determined from the control signal for pixels within the transition region.

16. The method of claim 14 wherein step e) includes performing a weighted average of the color values of the first digital image, the color values of the second digital image, and the key color, where the weighting values are determined from the control signal for pixels within the transition region.

17. The method of claim 16 wherein the first and second digital images are combined using the following equation:

$$R=F+kS-kC$$

where k is the control signal, F is the color value of a pixel in the first digital image, S is the color value for a corresponding pixel in the background digital image, C is the key color, and R is the color value of the combined image.

18. A computer program product having a computer program stored therein for determining a control signal for use in combining a first digital image that includes both a foreground region and a key color region having an associated key color with a second background digital image, both images being comprised of pixels having color values, comprising the steps of
   a) segmenting the first digital image into a foreground region and a key color region;
   b) identifying transition region pixels in the first digital image that are in the vicinity of a spatial boundary between the segmented foreground region and the segmented key color region;
   c) computing a color difference signal between the color values of the first digital image and the key color for at least some pixels in the transition region; and
   d) computing a control signal for the transition region pixels as a function of the color difference signal, where the control signal is to be used to combine the foreground region of the first digital image with the second background digital image.

19. A computer program product having a computer program stored therein for determining a control signal for use in combining a first digital image that includes both a foreground region and a key color region having an associated key color with a second background digital image, both images being comprised of pixels having color values, comprising the steps of:
   a) segmenting the first digital image into a foreground region and a key color region;
   b) identifying transition region pixels in the first digital image that are in the vicinity of a spatial boundary between the segmented foreground region and the segmented key color region;
   c) computing a color difference signal between the color values of the first digital image and the key color for at least some pixels in the transition region;
   d) computing a control signal for the transition region pixels as a function of the color difference signal, where the control signal is to be used to combine the foreground region of the first digital image with the second background digital image; and
   e) combining the first digital image with a second background digital image to produce the composite image.

* * * * *